Figure 1:
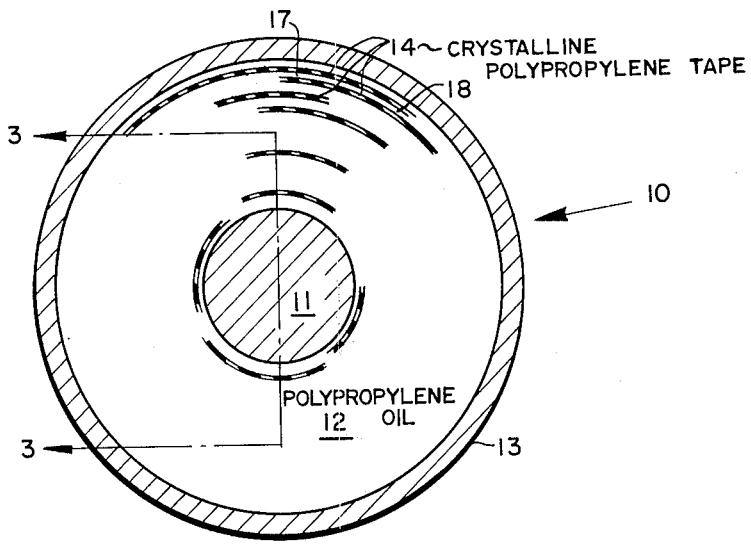

Jan. 11, 1966  B. P. KANG  3,229,024
POLYPROPYLENE FILLED CABLE
Filed Dec. 21, 1962

INVENTOR.
BUN P. KANG
BY
V F Voek
HIS AGENT

United States Patent Office 3,229,024
Patented Jan. 11, 1966

3,229,024
POLYPROPYLENE FILLED CABLE
Bun P. Kang, Highland Park, Ill., assignor, by mesne assignments, to Anaconda Wire and Cable Company, a corporation of Delaware
Filed Dec. 21, 1962, Ser. No. 246,603
The portion of the term of the patent subsequent to Feb. 12, 1980, has been disclaimed
3 Claims. (Cl. 174—25)

This application is a continuation-in-part of copending application Serial No. 720,427 now Patent No. 3,077,514.

My invention relates to electric power cables and particularly to such cables insulated with liquid polypropylene.

In the manufacture of power cables for operation at high voltages, solid insulation is applied in the form of tapes wrapped in a plurality of layers around the cable conductor. Since, in the wrapping of tapes some spacings are unavoidably left therebetween, these spacings are filled with dielectric hydrocarbon oils. Where the insulating tape is paper, the usual case, in addition to filling the spacings the oil wicks into the pores of the paper and saturates it. Known types of cable oils have been chosen because of their stability, dielectric strength, dielectric constant and electrical resistivity and oils of different viscosity are selected for different types of cable. For example, an oil-filled cable where the oil is introduced after the cable has been fully sheathed must have a very fluid, low-viscosity oil to insure a thorough penetration, while the oil of a gas-filled, pipe-type cable, where the oil-saturated cable core is contained in an oversized pipe filled with an insulating gas under pressure, a high-viscosity oil that won't drain out, is applied to the paper insulation layers. I have discovered that liquid polypropylene, which has heretofore been an unwanted by-product of the manufacture of the solid polymer, has unexpected advantages as a cable insulating oil, and have invented an electric power cable comprising an elongated metal conductor, a wall of insulation comprised of a plurality of layers of insulating tape surrounding the conductor, and liquid polypropylene filling a sheath surrounding the conductor and insulation. The tapes have spacings therebetween, and the polypropylene liquid fills these spacings. The insulating tapes may advantageously be comprised of paper which will be saturated by the polypropylene liquid and preferably the insulating tapes may be a crystalline solid polypropylene. Preferably the polypropylene liquid of my cables will have a viscosity in Saybolt Universal seconds between 40 at 100° F. and 3000 at 212° F. I have invented tape-insulated cables with the layers wetted with polypropylene liquid having a viscosity sufficient to prevent flow from the layers at the operating temperature of the cable.

It has been a recognized disadvantage of oil-paper cables that they are not electrically homogeneous because the dielectric constant of the paper is much higher than the dielectric constant of the oil. This means not only that, under A.-C. potential stress, the oil is disproportionately stressed relative to the total insulation thickness, but points of stress concentration are apt to occur at irregularities in the oil-paper interfaces. By combining polypropylene oil with polypropylene tapes I have discovered a means of making a cable that is electrically homogeneous, since the tapes and the oil have the same dielectric constant, and retains the advantages of oil-tape construction which include ability to expand and contract without creating voids, flexibility in manufacturing to any desired wall thickness, and economy of manufacture. The oil-tape construction is the only one that can be employed for very high voltages such as those in excess of 50,000 volts, and, prior to my invention, no electrically homogeneous insulation was known for very high-voltage cables. My combination of polypropylene tapes and polypropylene oil provides such an insulation. Solid polypropylene is known in both crystalline and amorphous form. The amorphous tapes, while they do not dissolve in polypropylene oil, do undergo dimensional distortions, so that only tape made from the crystalline polymer is suitable for insulating cables in combination with polypropylene liquid.

A more thorough understanding of my invention may be gained from the appended drawing.

Figure 3:
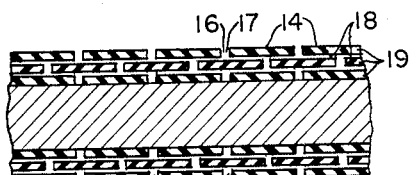
Figure 2:
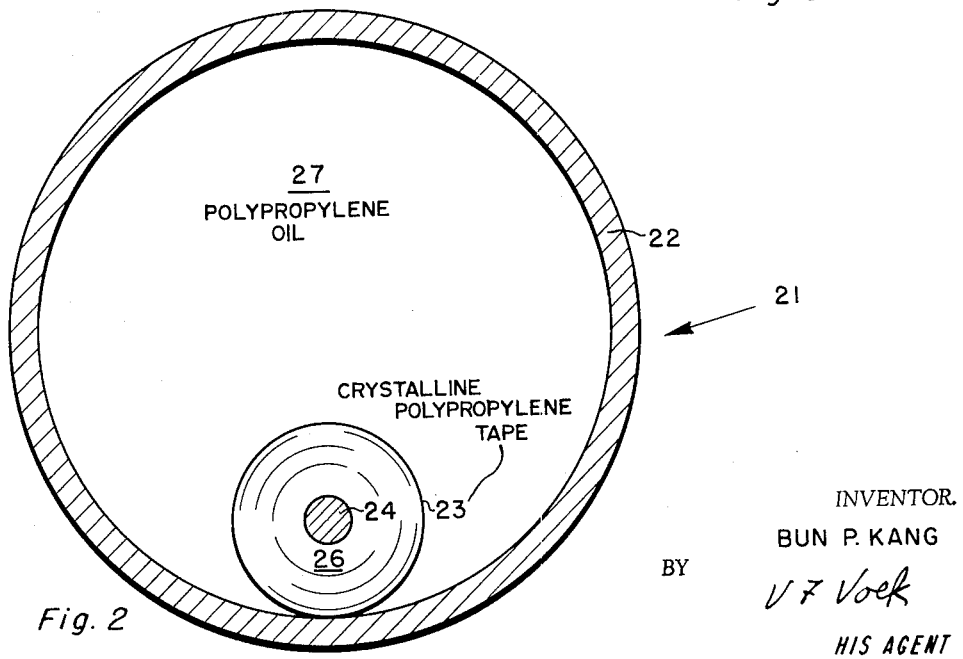

In the drawing:
FIGURE 1 is a section of a lead-sheathed cable made to my invention.
FIGURE 2 is a section of a pipe-type cable made to my invention.
FIGURE 3 is a partial section through the lines 3—3 of FIGURE 1.

Referring to FIGURE 1 a cable, indicated generally by the numeral 10, has a conductor 11, an insulating wall 12 and a lead sheath 13. The insulation 12 is comprised of layers 14 of spirally applied tapes of dielectric material. The tapes 14 are commonly comprised of paper and, in the manufacture of high-voltage power cables, they are applied under tension to build a tight, compact insulating wall. There are, however, spacings 16 between the tapes making up a layer of the insulation as can best be seen in FIGURE 3. These spacings are required to keep the tapes from buckling when the cable is flexed but it is essential that they be filled with dielectric liquid 17. When the tapes 14 are paper the natural porosity of the paper provides means for oil to reach the spacings 16. When dielectric plastics such as polyethylene, polyester, polycarbonate or polypropylene are employed it is known to groove or krinkle the tapes to provide passageways for the dielectric liquid. In this case there will be additional spacings 18 between layers 19 of the insulation which must also be filled with the oil 17. In FIGURE 2 I show a cable indicated generally by the numeral 21 wherein the close-fitting lead sheath 13 of FIGURE 1 has been replaced by a pipe 22 large compared to an enclosed cable core 23. It will be understood that the word "sheath" is used in this application to include large inclosures such as the pipe 22. The core 23 has a conductor 24 and taped insulation 26 comprised of tapes such as the tapes 14 and also filled with dielectric fluid. It will be understood that although I have shown only one cable core within the pipe 22, a plurality of such cores, such as 3 for a 3-phase system, can be included within one sheath.

The selection of a proper viscosity for the dielectric liquid 17 depends, to a large extent on the method of manufacturing the cable, and on the nature of the dielectric between the cable core and the sheath. In the pipe-type cable 21 a space 27 may be filled with pressurized oil similar to the oil 17 but of low viscosity so that it may be readily pumped and passed through cooling systems and filters (not shown) which are known for use with pipe-type cable systems. On the other hand the space 27 may be filled with pressurized gas. In this case it is necessary that the oil in the cable core should have a high enough viscosity at the operating temperature of the cable to prevent its flowing out of the spacings 16, 18 because once it flows out, there is no surrounding oil in the space 27 to replace it.

Although I have shown a sheath 22 around the core 23, it will be understood that where the voltage is not so high as to require a pressurized cable, cable cores of the type of the core 23 comprising very viscous dielectric will have utility for power transmission without the sheath 22. In applying the dielectric liquid 17 to the tapes 14 where the viscosity of the liquid is too great even at high temperatures to penetrate through the layers after the tapes have been wrapped, the liquid can be applied to the surfaces of the tape prior to wrapping or during the wrapping operation. In other cases the cable cores can be mass impregnated in impregnating tanks under heat and pressure which assist the penetration of the oil, particularly where the tank has first been evacuated to remove all air from the core. In still other cases the conductor 11 may be hollow and the dielectric liquid 17 introduced into the cable after sheathing. In this case a very low viscosity oil is needed to assure its penetration through a long length of the sheathed cable.

Referring, again, to FIGURE 3 it will be seen that all cable insulations known up to now have been non-homogeneous electrically in that the tapes 14 have had a dielectric constant differing from that of the liquid 17. Where the tapes 14 are, for example, made of paper, the cellulose fibers of which have a dielectric constant of about 6, used in conjunction with a standard cable oil with a dielectric constant of about 2.3, there are numerous electrical discontinuities in the body of the insulation. In addition the dielectric stress in volts per mil is over twice the value for the oil as for the paper since the stress is inversely proportional to the dielectric constant. When, in accordance with my invention, polypropylene liquid is used in conjunction with paper it has the advantage of providing an oil which can be selected from a wide range of viscosities. It also has unexpected electrical stability, as will hereinafter be described but, although this combination of polypropylene liquid and paper has a wide utility, since polypropylene *oil* liquid has a dielectric constant of about 2.2, the electrical discontinuity remains. I have, however, invented a taped cable that is completely homogeneous by substituting polypropylene tape 14 instead of paper for use with polypropylene oil. The tape having practically the same dielectric as the oil, there are no electrical discontinuities whatever in my new taped insulation.

The measurement of electrical power factors has been a standard method of evaluating cable insulations, and power factor measurements made during accelerated artificial aging provide a means of prejudging the long-time serviceability of an insulation.

To evaluate the cables of my invention, specimens of polypropylene liquid supplied by the Amoco Chemicals Corp. of 910 S. Michigan Ave., Chicago, Ill. as Amopol Polypropene C-60, C-100 and C-175 were aged for 2 days at 115° C., after which time the power factors at 100° C. were measured. For comparison, a standard cable oil was tested under the same conditions. The results are shown in the table.

*Table*

| | Viscosity, S.U.S. at 210° F. | Aged Power Factor |
|---|---|---|
| Polypropylene C-60 | 280 | 0.027 |
| Polypropylene C-100 | 460 | 0.033 |
| Polypropylene C-175 | 790 | 0.119 |
| Cable oil | | 0.331 |

I have invented a new and useful electric power cable for which I desire an award of Letters Patent.

I claim:
1. A high-voltage electric power cable comprising:
 (A) an elongated metal conductor,
 (B) a wall of insulation surrounding said conductor,
  (a) said insulation being comprised of a plurality of layers of crystalline polypropylene insulating tape
  (b) having spacings therebetween,
 (C) a tubular sheath surrounding said conductor and said insulation, and
 (D) liquid polypropylene
  (a) filling said sheath and
  (b) said spacings.
2. The electric power cable of claim 1 wherein said polypropylene has a viscosity in Saybolt Universal seconds between 40 at 100° F. and 3000 at 212° F.
3. A high-voltage electric power cable comprising:
 (A) an elongated metal conductor,
 (B) a wall of insulation surrounding said conductor,
  (a) said insulation being comprised of a plurality of layers of crystalline polypropylene insulating tape,
  (b) having spacings therebetween, and
 (C) liquid polypropylene
  (a) coating the surfaces of said layers and
  (b) filling said spacings,
  (c) said liquid polypropylene having a viscosity at the operating temperature of said cable sufficient to prevent flowing from said spacings.

References Cited by the Examiner

UNITED STATES PATENTS

| 2,443,974 | 6/1948 | Atkinson | 252—63 |
| 3,033,727 | 5/1962 | Cram et al. | 174—110 X |
| 3,077,514 | 2/1963 | Kang | 174—110 |
| 3,112,301 | 11/1963 | Natta et al. | |

FOREIGN PATENTS

| 223,198 | 7/1959 | Australia. |

OTHER REFERENCES

The Condensed Chemical Dictionary—sixth edition, Reinhold Publishing Corp., N.Y., August 1961, QD5C5, 1961, ch. 12, pg. 917.

ROBERT K. SCHAEFER, *Primary Examiner.*

JOHN P. WILDMAN, JOHN F. BURNS, LARAMIE E. ASKIN, E. JAMES SAX, *Examiners.*

W. F. ZAGURSKI, D. A. KETTLESTRINGS,
*Assistant Examiners.*